United States Patent
Cosmadopoulos et al.

(10) Patent No.: US 9,723,048 B2
(45) Date of Patent: Aug. 1, 2017

(54) SYSTEM AND METHOD FOR PROVIDING TIMER AFFINITY THROUGH NOTIFICATIONS WITHIN A SESSION-BASED SERVER DEPLOYMENT

(75) Inventors: Ioannis Cosmadopoulos, San Francisco, CA (US); Mihir Arvind Kulkarni, Fremont, CA (US); Johan Gustav Larson, Waterloo (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 703 days.

(21) Appl. No.: 12/260,846

(22) Filed: Oct. 29, 2008

(65) Prior Publication Data

US 2010/0106842 A1 Apr. 29, 2010

(51) Int. Cl.
*G06F 15/16* (2006.01)
*H04L 29/06* (2006.01)
*H04L 29/08* (2006.01)

(52) U.S. Cl.
CPC .......... *H04L 65/80* (2013.01); *H04L 67/2852* (2013.01); *H04L 69/28* (2013.01)

(58) Field of Classification Search
CPC ..... H04L 65/80; H04L 69/82; H04L 67/2852; H04L 65/1006; H04L 67/14; H04L 67/142; H04L 69/28
USPC ........................................................ 709/228
See application file for complete search history.

(56) References Cited

U.S. PATENT DOCUMENTS

| | | | |
|---|---|---|---|
| 5,325,360 A * | 6/1994 | Friedrich | 370/453 |
| 5,590,288 A | 12/1996 | Castor et al. | |
| 5,659,596 A * | 8/1997 | Dunn | 455/456.1 |
| 5,675,800 A | 10/1997 | Fisher et al. | |
| 6,014,744 A * | 1/2000 | McKaughan et al. | 713/2 |
| 6,173,323 B1 * | 1/2001 | Moghe | 709/224 |
| 6,272,626 B1 * | 8/2001 | Cobbett | 713/2 |
| 6,279,076 B1 | 8/2001 | Shishido et al. | |
| 6,449,663 B1 * | 9/2002 | Carney et al. | 710/15 |
| 6,557,026 B1 * | 4/2003 | Stephens, Jr. | 709/203 |
| 6,615,161 B1 * | 9/2003 | Carney et al. | 702/186 |
| 6,643,813 B1 * | 11/2003 | Johansson et al. | 714/748 |
| 6,721,286 B1 | 4/2004 | Williams et al. | |
| 6,823,382 B2 * | 11/2004 | Stone | 709/224 |
| 6,973,479 B2 * | 12/2005 | Brady et al. | 709/203 |
| 7,003,607 B1 * | 2/2006 | Gulick | 710/110 |
| 7,085,229 B1 * | 8/2006 | Potter, Jr. | H04L 12/5693 370/229 |
| 7,089,307 B2 * | 8/2006 | Zintel et al. | 709/224 |
| 7,184,753 B2 * | 2/2007 | Huynh | 455/412.1 |

(Continued)

*Primary Examiner* — Daniel C. Murray
(74) *Attorney, Agent, or Firm* — Tucker Ellis LLP

(57) ABSTRACT

The session-based server deployment can be comprised of an engine tier that is designed for high throughput processing of communications and a state tier that maintains state information for access by the engine tier. The engine tier can include a plurality of engine nodes that process incoming messages. The state nodes can contain call state, including various timers. When processing a call, an engine can set various timers in the state tier. Upon expiration of a timer, the state node can transmit a notification assigning the timer to the corresponding engine node which handled previous communications for the call. This affinity between the timer and its respective engine can provide numerous benefits, such as reduced latency and more localized data access.

20 Claims, 9 Drawing Sheets

(56) References Cited

U.S. PATENT DOCUMENTS

| | | | |
|---|---|---|---|
| 7,305,675 B1* | 12/2007 | Gulick | 718/102 |
| 7,321,589 B2* | 1/2008 | Lohr et al. | 370/394 |
| 7,337,473 B2* | 2/2008 | Chang et al. | 726/27 |
| 7,380,073 B2 | 5/2008 | Shorb | |
| 7,444,466 B2* | 10/2008 | Cravens et al. | 711/112 |
| 7,523,197 B2* | 4/2009 | Castaneda et al. | 709/224 |
| 7,529,805 B2 | 5/2009 | Martinez et al. | |
| 7,548,969 B2* | 6/2009 | Tripp et al. | 709/223 |
| 7,554,992 B2* | 6/2009 | Kimura et al. | 370/400 |
| 7,590,100 B2* | 9/2009 | Smith et al. | 370/346 |
| 7,606,895 B1* | 10/2009 | Dini et al. | 709/224 |
| 7,631,076 B2* | 12/2009 | Cannon et al. | 709/225 |
| 7,644,170 B2* | 1/2010 | Clarke et al. | 709/230 |
| 7,661,027 B2* | 2/2010 | Langen et al. | 714/15 |
| 7,685,302 B2* | 3/2010 | Clarke | 709/230 |
| 7,761,658 B2* | 7/2010 | Cravens et al. | 711/112 |
| 7,813,299 B2* | 10/2010 | Yumoto et al. | 370/254 |
| 7,894,444 B2* | 2/2011 | Lohr et al. | 370/394 |
| 7,954,005 B2* | 5/2011 | Langen et al. | 714/15 |
| 8,060,882 B2* | 11/2011 | Gulick | 718/102 |
| 8,112,525 B2* | 2/2012 | Langen et al. | 709/226 |
| 8,112,532 B2* | 2/2012 | Ahluwalia et al. | 709/227 |
| 8,179,912 B2* | 5/2012 | Cosmadopoulos et al. | 370/449 |
| 8,219,697 B2* | 7/2012 | Langen | H04L 29/12188 709/220 |
| 8,341,453 B2* | 12/2012 | Shiraishi | H04L 69/28 713/502 |
| 8,495,222 B2* | 7/2013 | Yamamoto | 709/227 |
| 2002/0073211 A1* | 6/2002 | Lin et al. | 709/229 |
| 2002/0112182 A1* | 8/2002 | Chang et al. | 713/201 |
| 2002/0188707 A1* | 12/2002 | Terrill | 709/223 |
| 2003/0036886 A1* | 2/2003 | Stone | 702/188 |
| 2003/0208579 A1* | 11/2003 | Brady et al. | 709/223 |
| 2004/0086102 A1* | 5/2004 | McMurry et al. | 379/219 |
| 2004/0152439 A1* | 8/2004 | Kimura et al. | 455/403 |
| 2004/0172421 A1 | 9/2004 | Saito et al. | |
| 2005/0022210 A1* | 1/2005 | Zintel et al. | 719/318 |
| 2005/0033847 A1* | 2/2005 | Roy | 709/227 |
| 2005/0038897 A1* | 2/2005 | Clarke | 709/230 |
| 2005/0038915 A1* | 2/2005 | Clarke et al. | 709/250 |
| 2005/0117576 A1 | 6/2005 | McDysan et al. | |
| 2005/0174950 A1 | 8/2005 | Ayyagari | |
| 2005/0210128 A1* | 9/2005 | Cannon et al. | 709/224 |
| 2005/0262477 A1* | 11/2005 | Kovachka-Dimitrova et al. | 717/118 |
| 2005/0265276 A1 | 12/2005 | Takeda et al. | |
| 2005/0281251 A1* | 12/2005 | Yumoto et al. | 370/352 |
| 2006/0010438 A1* | 1/2006 | Brady et al. | 717/174 |
| 2006/0174271 A1 | 8/2006 | Chen et al. | |
| 2007/0027987 A1* | 2/2007 | Tripp et al. | 709/225 |
| 2007/0078976 A1* | 4/2007 | Taylor et al. | 709/224 |
| 2007/0130273 A1* | 6/2007 | Huynh | 709/206 |
| 2007/0147330 A1* | 6/2007 | Smith et al. | 370/346 |
| 2007/0169170 A1* | 7/2007 | Shiran | 726/2 |
| 2007/0198774 A1* | 8/2007 | Cravens et al. | 711/112 |
| 2007/0214256 A1* | 9/2007 | Castaneda et al. | 709/224 |
| 2007/0220126 A1* | 9/2007 | Raghunathan et al. | 709/223 |
| 2007/0220136 A1* | 9/2007 | Raghunathan et al. | 709/224 |
| 2007/0288629 A2* | 12/2007 | Taylor et al. | 709/224 |
| 2008/0086567 A1* | 4/2008 | Langen et al. | 709/230 |
| 2008/0086573 A1 | 4/2008 | Martinez et al. | |
| 2008/0098117 A1* | 4/2008 | Fukuhara et al. | 709/227 |
| 2008/0127232 A1* | 5/2008 | Langen | H04L 29/12188 719/328 |
| 2008/0144630 A1* | 6/2008 | Hayashida et al. | 370/395.1 |
| 2008/0147551 A1* | 6/2008 | Connelly | 705/44 |
| 2008/0155310 A1* | 6/2008 | Langen et al. | 714/6 |
| 2008/0178181 A1* | 7/2008 | Gulick | 718/102 |
| 2008/0189421 A1* | 8/2008 | Langen et al. | 709/227 |
| 2008/0225835 A1* | 9/2008 | Oda et al. | 370/352 |
| 2008/0294731 A1* | 11/2008 | Roy | 709/206 |
| 2008/0294842 A1* | 11/2008 | Cravens et al. | 711/112 |
| 2008/0313345 A1* | 12/2008 | Bernardin et al. | 709/235 |
| 2009/0019158 A1* | 1/2009 | Langen et al. | 709/226 |
| 2009/0083570 A1* | 3/2009 | Shiraishi | H04L 69/28 713/600 |
| 2009/0125627 A1* | 5/2009 | Ford | 709/227 |
| 2009/0182896 A1* | 7/2009 | Patterson | H04L 45/02 709/241 |
| 2010/0080241 A1* | 4/2010 | Cosmadopoulos et al. | 370/449 |
| 2010/0115050 A1* | 5/2010 | Sultenfuss et al. | 709/217 |
| 2010/0205263 A1* | 8/2010 | Langen et al. | 709/206 |
| 2014/0189025 A1* | 7/2014 | Beslic et al. | 709/206 |
| 2014/0281098 A1* | 9/2014 | Hellwig et al. | 710/308 |

* cited by examiner

SYSTEM AND METHOD FOR PROVIDING TIMER AFFINITY THROUGH NOTIFICATIONS WITHIN A SESSION-BASED SERVER DEPLOYMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

The following commonly owned, co-pending United States patent applications are related to the present application and are incorporated by reference herein in their entireties:

U.S. patent application Ser. No. 11/748,791, entitled ENGINE NEAR CACHE FOR REDUCING LATENCY IN A TELECOMMUNICATIONS ENVIRONMENT, by Anno R. Langen, et al., filed on May 15, 2007; and U.S. patent application Ser. No. 12/239,578, entitled SYSTEM AND METHOD FOR PROVIDING TIMER AFFINITY THROUGH ENGINE POLLING WITHIN A SESSION-BASED SERVER DEPLOYMENT, by Ioannis Cosmadopoulos et al., filed on Sep. 26, 2008.

FIELD OF THE INVENTION

The current invention relates generally to managing telecommunications and timers and more particularly to providing affinity for session-based timers within a cluster network deployment.

BACKGROUND

With the advent and the ever-increasing popularity of the World Wide Web, more and more previously unrelated technologies are becoming integrated with the enormous network of information and functionality that the Internet provides. Everything from television and radio to telephony and video conferencing are now available online, amongst a wide variety of other technologies. One such area of technology that has seen a recent explosion in growth, is telecommunications and related services.

Conventionally, telecommunications and network infrastructure providers have relied on often decades-old switching technology for providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies have been transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound these pressures.

Delivering more sophisticated data services has proved to be more difficult than first imagined. Existing information technology (IT) and network infrastructures, closed proprietary network-based switching fabrics and the like have proved to be complex and rigid in allowing the creation and deployment of new service offerings.

In recent times, specialized telecommunication application servers have emerged to enable simpler ways for developers to include telephony-based functionality in their software applications, as well as to provide increased security and stability. Nevertheless, these specialized solutions continue to need improvements in performance generally required by network operators and demanded by their subscribers.

One such area for improvement involves the performance in processing of various communications at the server level. The telephony protocols are typically extremely time-sensitive, more so than standard Web and HTTP transmissions. Accordingly, it would be desirable to optimize the processing of various telecommunications so as to minimize latency and improve performance. In addition, it would be advantageous to provide these improvements in distributed and highly scalable deployments, accessible via voice over internet protocols (VoIP).

DETAILED DESCRIPTION

Figure 1:
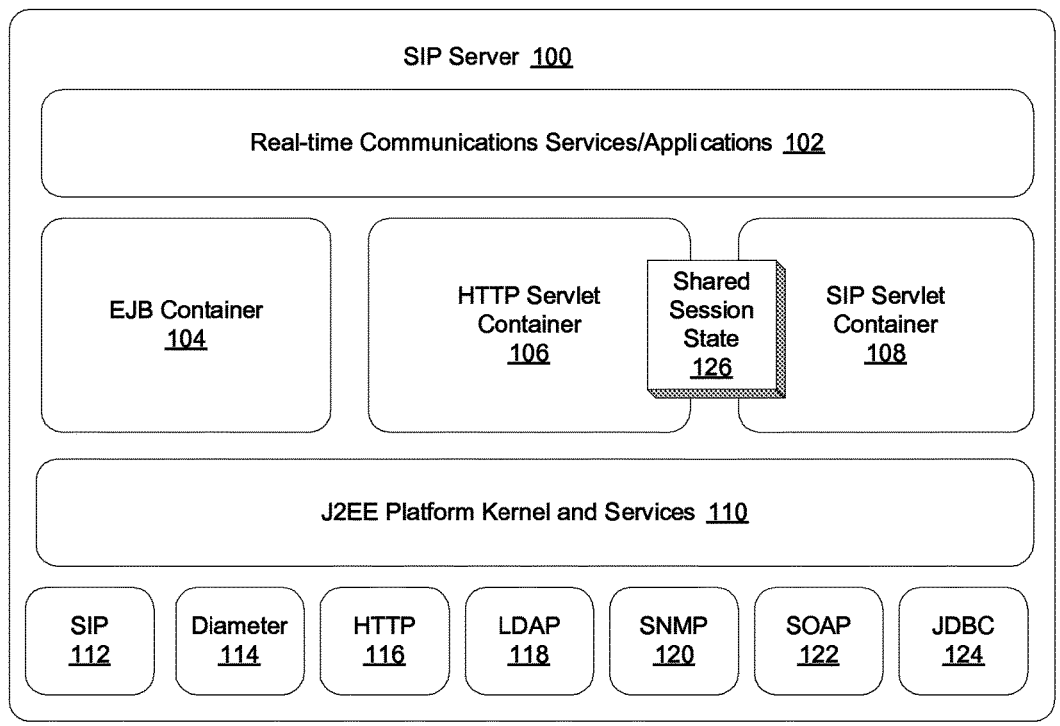
FIG. 1 is an exemplary illustration of various components of the SIP Server, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are described systems and methods for providing timer affinity in session initiation protocol (SIP)-based server deployments. The session initiation protocol (SIP) is a well known and widely used signaling protocol used to create, modify and terminate sessions between multiple participants during telecommunications across the internet or other networks. These sessions can include internet telephone calls, video conferencing, multimedia interactions and the like. The SIP application server is thus used to deploy and manage software applications, which implement the SIP protocol in some way. In various embodiments, the SIP server delivers a highly available service convergence platform for network operators, network equipment providers, systems integrators, and independent software vendors (ISVs) that seek to develop, integrate and operate real-time, multimedia communication services.

Generally, the SIP protocol includes a number of protocol timers, which are used to control the interactions between the multiple participants in a session. For example, in SIP, when something does not occur within a certain specified time period in a session, a timer will fire causing some corrective (or other) action to be taken. An illustration of this can be a cellular telephone client trying to establish a connection with another client via an INVITE message. If one fails to respond within a certain time period, a timer will fire and an action will be taken to address the situation. These SIP protocol timers are specified in the SIP protocol and are generally used to standardize communications.

In addition, a SIP application server can also include application timers which are implemented by the software application deployed thereon. For example, a video conferencing application may implement timers for various reasons unrelated to the SIP protocol, such as to notify the participants of a particular event.

In the various embodiments, these and other timers are processed by a SIP server engine during the course of the various sessions. In one embodiment, the SIP server is deployed as two separate tiers in order to gain the optimal performance and minimum latency. An engine tier is designed for handling high throughput processing of SIP communications. The engine tier remains mostly stateless and is designed to process the various communications with as little latency as possible. The state tier, on the other hand, maintains state information for access by the engine tier. The state tier is an in-memory RAM data store for maintaining the data required during the engine tier processing. In one embodiment, when processing a request, the engine node will retrieve the needed state information from a state node and when finished, update the state information thereon. This multi-tier type of deployment can significantly improve performance, such as by reducing latency during garbage collection in the state tier, as well as providing numerous other benefits.

In various embodiments, the timers are part of the state information contained in the state tier of the SIP server deployment. While the engine nodes process the timers, the state nodes will typically designate which engine node will process the particular timers. In one implementation, the timers can be distributed evenly across the multiple engine nodes so as not to overload any particular engine in the deployment. However, because there is often an association that exists between a call and a particular engine, it may be desirable to create affinity between the timers associated with a particular call session and the engine that handled the last message for that call session. For example, with sticky load balancing deployments, the load balancer will distribute the incoming message for a particular call to the engine node that handled the last message for that call. This is desirable because the engine may be able to avoid having to retrieve the state information for the particular call from the state tier, since that state information may already be residing there from previous processing. For example, in various embodiments, the engines implement a near-cache which maintains a small portion of state information associated with certain a session(s) on the assumption that the engine will need that state information again in the very near future because it will likely receive another message associated with the particular session that it is currently processing. The engine near-cache is described in more detail in the U.S. patent application Ser. No. 11/748,791, entitled ENGINE NEAR CACHE FOR REDUCING LATENCY IN A TELECOMMUNICATIONS ENVIRONMENT, which is incorporated herein in its entirety.

Accordingly, if timers can be fired on the same engine that processed the last message for the call, there is a higher likelihood that this engine will have the needed state information available in the near-cache, thereby eliminating the need to contact the state tier. This can reduce network bandwidth and improve performance. Furthermore, any other information, unrelated to SIP protocol state (e.g. media server data) may be local to the engine node and timer affinity would avoid having to retrieve it again when timers are fired.

Another possible use case of timer affinity can be seen in a "hot standby" deployment where two engines are running simultaneously but only one engine is actually processing any calls. In such a deployment, the secondary engine does not process any messages and is essentially used for redundancy purposes in order to take over processing calls in the event of primary engine failure. Because the primary engine is the only node that is processing calls, allocating the timers evenly (across both engines) would be undesirable since that may cause both engines to process messages, creating possible errors in IP addresses, and other undesirable issues. Creating some correlation between the timer for a particular session and the engine that processed the last message for that session can remove these unnecessary burdens and resolve these inconveniences.

The various embodiments are described in more detail with reference to the figures in the paragraphs below.

SIP Server

FIG. 1 is an exemplary illustration of various components of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP Server 100 is a carrier-class Java Enterprise Edition (J2EE) application server that has been extended with support for the Session Initiation Protocol (SIP) and other operational enhancements that allow it to meet the demanding requirements of next-generation internet protocol (IP) based communications networks. The SIP Server can be used to create, deploy and manage various real-time communications services and applications 102 by telecom operators who wish to provide mobile and fixed multimedia services. As with any Java application server, the SIP server can take advantage of the J2EE Platform Kernel and Services 110 in order to compile, execute and optimize the performance of various programs and applications. In one embodiment, the SIP server 100 is also extended with support for a multitude of standards and protocols such as SIP 112, Diameter 114, Hyper Text Transfer Protocol (HTTP) 116, Lightweight Directory Access Protocol (LDAP) 118, Simple Network Management Protocol (SNMP) 120, Simple Object Access Protocol (SOAP) 122, Java Database Connectivity (JDBC) 124, and others.

As stated previously, the SIP Server 100 is enabled to support session initiation protocol (SIP). SIP is a protocol used primarily for creating and terminating sessions with one or more participants, such as setting up or tearing down voice or video calls. SIP is described in more detail in RFC 3261 of the IETF SIP Working Group, which is incorporated herein by reference.

The SIP protocol specification defines different types of high level SIP roles, namely user agents (UA) which include UA clients, UA servers, and Back-to-Back user agents (B2BUA). The SIP protocol also defines the roles of Proxies, Registrars and Redirect Servers. Accordingly, the SIP Servlet API of the SIP server 100 allows any of these roles to be coded as a SIP Servlet Application. Furthermore, because SIP is an extensible protocol, the API is also designed to allow developers to easily extend functionality. This can be accomplished by dividing up the SIP processing between the container functions and the applications. Most of the base protocol can be performed by the container, leaving the higher level tasks for the applications to perform. This division of processing can lead to a great amount of flexibility to the SIP Servlet API.

As further illustrated in FIG. 1, the SIP Server 100 can include an Enterprise Java Bean (EJB) container 104, an HTTP Servlet container 106 and a SIP Servlet container 108. Each of these containers can provide an environment that supports the execution of applications developed using its corresponding technology. For example, the EJB container 104 manages enterprise beans contained within it, which in turn provide the business logic for a J2EE application. This management can encompass services such as registering, creating and destroying objects and their instances, providing remote interfaces to objects, managing the state of objects, maintaining security, and coordinating distributed transactions. Similarly, the HTTP container 106 and the SIP Servlet container 108 can be responsible for managing HTTP and SIP servlets respectively.

The SIP stack of the SIP Server 100 can be fully integrated into the SIP Servlet container 108 and can be easier to use than a traditional protocol stack. For example the higher level abstraction of the SIP Servlet API can free the developer from the mechanics of handling of transaction timers, syntactic evaluation of received requests, generation of non application-related responses, generation of fully formed SIP requests from request objects (which may involve correct preparation of system headers and generation of syntactically correct SIP messages) and handling of lower-layer transport protocols such as Transport Control Protocol (TCP), User Datagram Protocol (UDP) and Stream Control Transmission Protocol (SCTP).

In one embodiment, the Servlet container can provide a Shared Session Context 126 and session application programming interface (API) in order to maintain awareness of the state of the larger converged SIP and HTTP application session. There are many use cases where a converged application, using both SIP and HTTP functions, is desirable. Some examples of these applications include conferencing and click-to-call applications, as well as Presence and User Agent Configuration Management applications. The converged applications can also use other protocols (e.g. Diameter) to perform more advanced functions such as modifying subscriber profile data. Furthermore, the container can provide a whole host of other services including distributing request and response objects to components in a structured way as well as managing the end-to-end object lifecycle, including resource, transaction and session state management.

Figure 2:
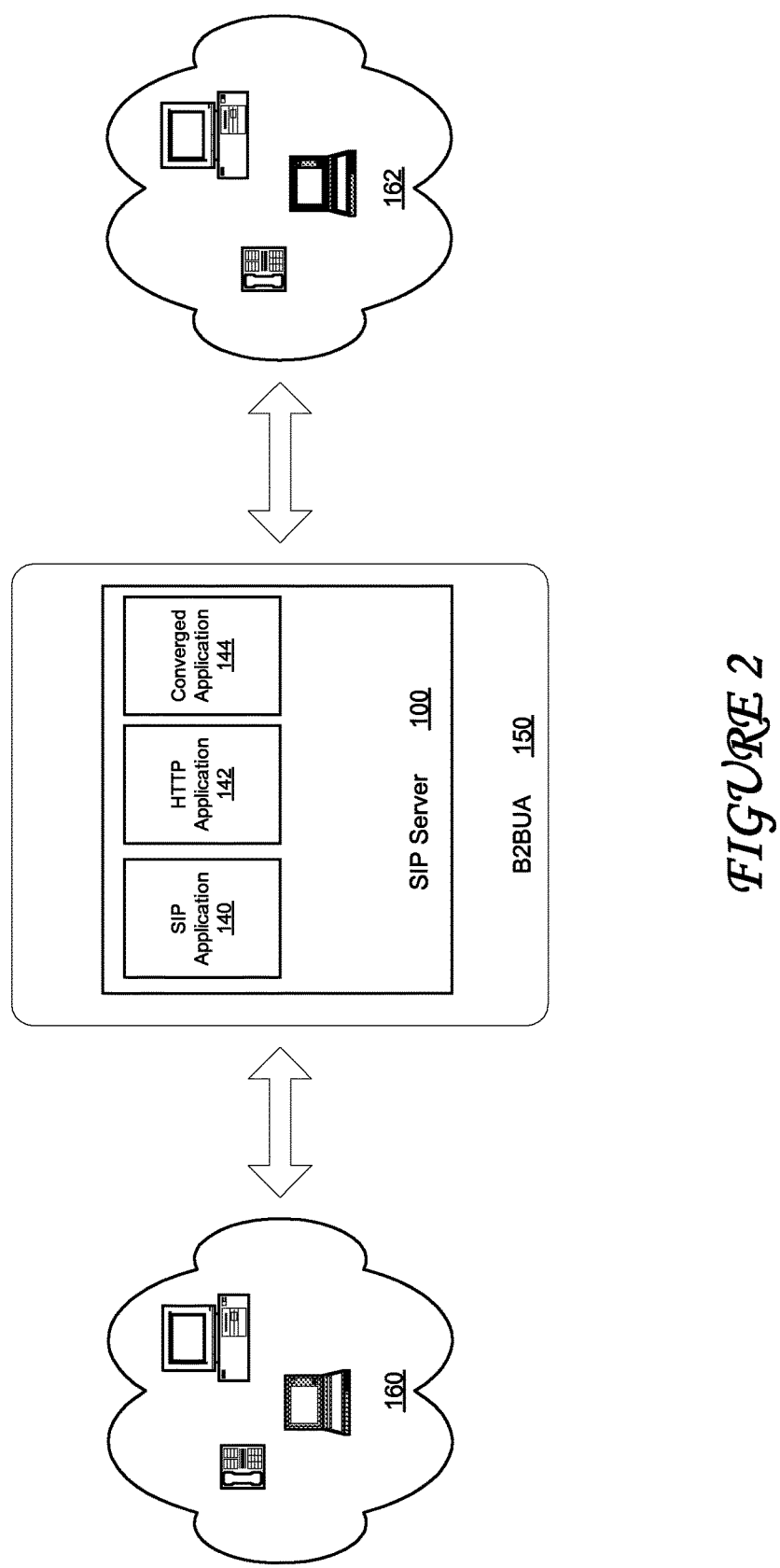
FIG. 2 is an illustration of an exemplary use of the SIP Server, in accordance with various embodiments.

FIG. 2 is an illustration of an exemplary use of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP server 100, along with the various applications hosted thereon (e.g. 140, 142 and 144), can be used as a back-to-back user agent (B2BUA) 150 in a typical telecommunications environment. A B2BUA can take the place of an intermediary between communications by user agents 160, 162, which may include various cellular phones, wireless devices, laptops, computers, applications, and other components capable of communicating with one another electronically. The B2BUA 150 can provide multiple advantages, such as controlling the flow of communication between user agents, enabling different types of user agents to communicate with one another (e.g. a web application can communicate with a cellular phone), as well as various security advantages. As one illustration, the user agents can transmit to the SIP server instead of communicating directly to each other and thus malicious users can be prevented from sending spam and viruses, hacking into other user agent devices, and otherwise compromising security. It should be noted that the SIP Server 100 need not necessarily take the role of a B2BUA as illustrated in FIG. 2, but can also be used as a proxy, a redirect server, or some other role defined by the SIP protocol.

Figure 3:
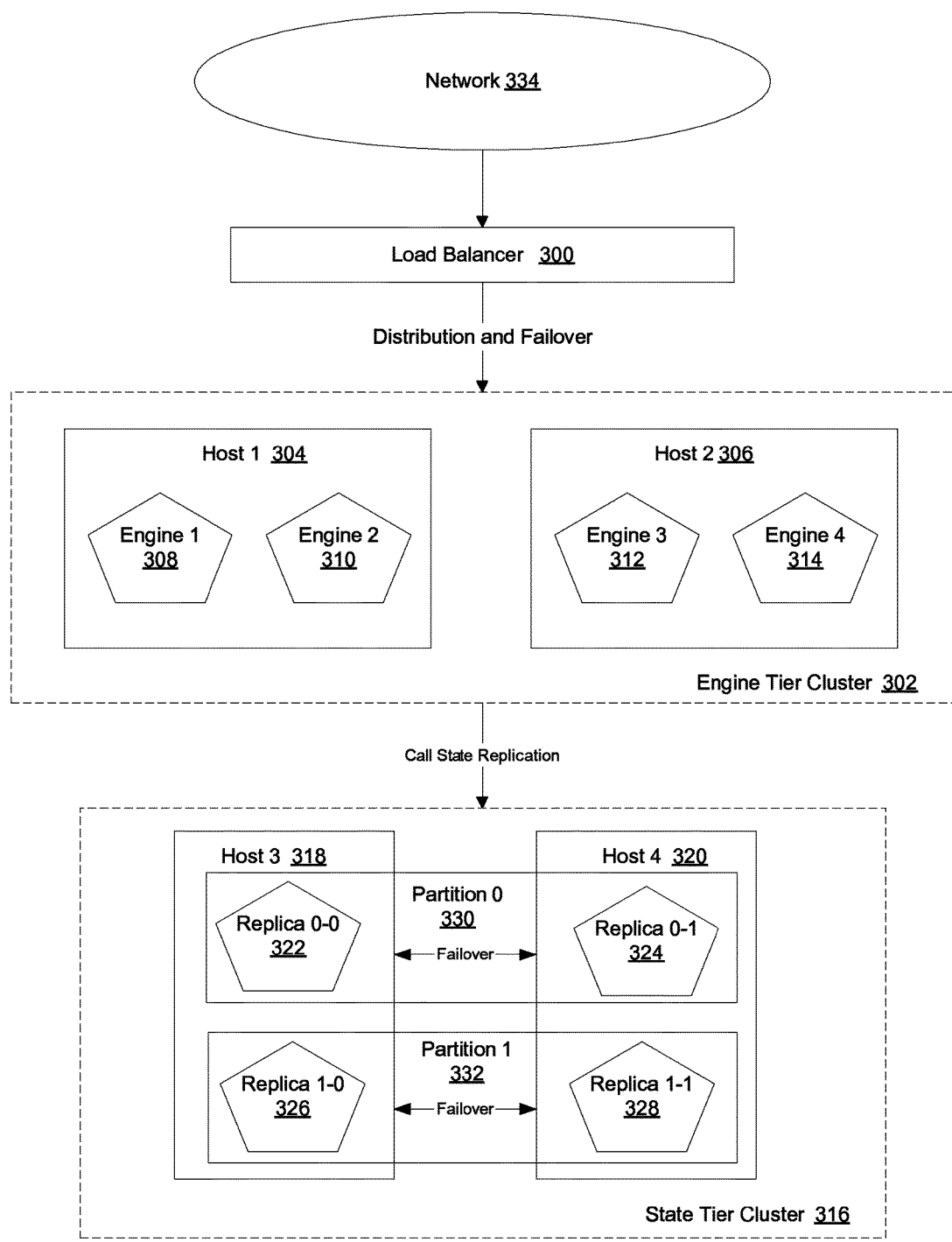
FIG. 3 is an exemplary illustration of a tiered architecture of the SIP server deployment, in accordance with various embodiments.

FIG. 3 is an exemplary illustration of a tiered architecture of the SIP server deployment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, messages, such as phone call initiation requests or other transfers of data associated with the SIP protocol, can come into the cluster from the internet (such as over VoIP), phone, or some other type of outside network 334. This message can be received and handled by a load balancer 300 which can be responsible distributing message traffic across the engines (i.e. engine 1 308, engine 2 310, engine 3 312 and engine 4 314) in the cluster which handle the processing of the message traffic. The load balancer can be a standard load balancing appliance hardware device and it is not necessary that it be SIP aware. Alternatively, the load balancer can be implemented as software that distributes the messages to the various engines. In certain embodiments, it is preferable that the load balancer be sticky, meaning that the load balancer distributes the messages associated with the same session or call to the same engine that handled the last message for the same session. This can provide performance advantages in that certain call state information may be readily available in the engine that handled the previous message. In the various embodiments, the primary goal of the load balancer 300 is to provide a single public address that distributes incoming SIP requests to available servers in the SIP server engine tier cluster 302. Such distribution of requests can ensure that the SIP server engines are fully utilized. The load balancer 300 can also be used for performing maintenance activities such as upgrading individual servers or applications without disrupting existing SIP clients.

In the embodiment illustrated, the SIP server can provide a two-tier cluster architecture model to handle the incoming messages. In this two-tier model, a "stateless" engine tier cluster 302 can process all signaling traffic and can also replicate transaction and session state to the state tier cluster 316 which in turn can be divided into multiple partitions. Each partition can consist of any number of nodes (replicas) distributed across any number of hosts such as host 3 318 and host 4 320 which can be implemented as computers linked in a cluster type network environment. For example, partition 0 330 can include state replica 0-0 322 and a state replica 0-1 324 which can maintain copies of the call state information of the partition. The state tier cluster 316 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

The engine tier cluster 302 can be implemented as a cluster of SIP server instances that hosts the SIP servlets which provide various features to SIP clients. In one embodiment, the engine tier is principally stateless, meaning that the majority of SIP session state information is not persisted in the engine tier, but is obtained by querying the state tier cluster 316 which can in turn provide replication and failover services for SIP session data. However, in many embodiments, the engine tier still maintains a small portion of call state, such as in the engine near-cache.

In various embodiments, the Java Virtual Machine (JVM) garbage collection algorithms can slow down the throughput processing and cause latency when removing stateful long-lived objects from memory. These stateful objects can be thought of as being more global (e.g. referenced by various threads and entities) than other localized stateless objects and as such, the garbage collector would typically stop all thread execution in order to clean them up. In some cases, this can introduce latency since the execution of various threads needs to be halted for a period of time while the garbage collector removes the unused stateful objects. While in typical web server environments this processing pause may be tolerated, the SIP server environment is generally highly sensitive to any latency and as such, this form of garbage collection pausing can be undesirable.

Accordingly, the call state, which may include such stateful objects, can be maintained in memory on the state tier of the SIP server deployment. The engine tier, on the other hand, can be generally stateless so as not to become significantly affected by the various JVM garbage collection and heap clearing processes. Thus, the primary goal of the engine tier 302 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier cluster 316 can be implemented as a cluster of SIP server instances that provides a high-performance, highly-available, in-memory store (e.g. RAM) for maintaining and retrieving session state data for SIP servlets. This session data may be required by SIP applications in the SIP server engine tier 302 in order to process incoming messages. Within the state tier 316, session data can be managed in one or more partitions (e.g. partition 0 330 and partition 1 332), where each partition manages a fixed portion of the concurrent call state. For example, in a system that uses two partitions, the first partition 0 330 could manage one half of the concurrent call state (e.g. A-M) and the second partition 1 332 can manage the other half (e.g. N-Z). With three partitions (not shown), each can manage a third of the call state and so on. Additional partitions can be added as needed to manage large number of concurrent calls or incoming messages.

In one embodiment, within each partition, multiple state servers can be added to provide redundancy and failover should the other servers in the partition fail. When multiple servers participate in the same partition, those servers can be referred to as replicas because each server maintains a duplicate copy of the partition's call state. For example, partition 0 330 can maintain its state information in replica 0-0 322 and replica 0-1 324. In some embodiments, the replicas can be distributed over multiple hosts (e.g. host 3 318 and host 4 320) in order to provide host-to-host failover services in cases where a computer crashes. Furthermore, to increase the capacity of the state tier 316, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas can join and leave the associated partition and each replica can serve as exactly one partition at a time. Thus, in one embodiment, the total available call state storage capacity of the cluster is a summation of the capacities of each partition.

In one embodiment, each partition can peer-replicated, meaning that clients perform all operations (reads/writes) to all replicas in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better host-to-host failover characteristics as well, since there does not need to be change propagation delay.

In one embodiment, the engine nodes 308, 310, 312 and 314 which are distributed over multiple hosts 304, 306, can be responsible for executing the call processing. Each call can have a call state associated with it. This call state can contain various information associated with the call, such as the ids of the caller/callee, where the caller is, what application is running on the callee, as well as any timer objects that may need to fire in order to process the call flow. The state for each call can be contained in the state tier 316. The engine tier 302, on the other hand, could be stateless in order to achieve the maximum performance. In alternative embodiments, the engine tier can have small amounts of state data stored thereon at selected periods of time.

In one embodiment, a typical message processing flow can involve locking/getting the call state, processing the message and putting/unlocking the call state. The operations supported by the replicas for normal operations can include:

lock and get call state—where the engines request state data from the state replicas in the partition and the primary replica locks that state data for processing across all the other replicas in the same partition.

put and unlock call state—where the engines update the state data to the state tier and the data is unlocked for access by other engines.

lock and get call states with expired timers—where session state data that has expired can be retrieved from the state tier.

As previously discussed, the state tier 316 can maintain call state in various data objects residing in the random access memory (RAM) of a computer. This can provide significant access speed advantages to the engine tier 302. The SIP server can also provide a way for efficiently persisting long-lived state information to a database (disk storage) in order to avoid unnecessary consumption of cluster resources. Since RAM is generally significantly more expensive than database memory, it may be desirable to reduce the number of replicas in the state tier 316 by storing at least some of the session state information to the database. In many cases, database access to data is slower than RAM-based replica access. However, because some SIP communications are not as latency-sensitive as others, these communications can be persisted in the database in order to save the amount of random access memory required by the SIP server deployment. For example, a standard telephone call can be viewed as having three stages—a call setup stage, an active call stage and the call teardown stage (hanging up the call). The call setup stage is typically the most latency-sensitive since users tend to expect immediate results from the server after pressing the call button. However, the call teardown stage may not be as sensitive to latency because after the handset disconnects, it may not matter from the user's perspective how long it will take for the server to complete call termination. As such, session state for call termination can be maintained in a database. Similarly, the active call stage may also be not as latency-sensitive as the call setup stage since it mostly involves communication of voice bits between media servers. It should be noted that this example of a telephone call is provided purely for purposes of illustration and is not intended to limit the invention.

Timer Affinity

In the various embodiments, affinity can be provided between the timer and the engine node that is processing the call. In order to process a call, state information (call state) is usually needed and this call state is stored and retrieved from the replicas in the state tier. Timers comprise a part of this call state information. In various embodiments, there can be several ways to implement the timer affinity feature, as discussed in further detail below.

In one implementation, in order to accomplish timer affinity, the engines can be set to repeatedly poll the state tier for expired timers. Once a timer fires, the state node can assign the expired timer to its engine owner at the next poll. For example, if the engine is set to poll the replica every 100 milliseconds (ms), and a timer expires between the polling interval, the replica can wait until the engine returns for the next poll before assigning it the expired timer for processing. In one embodiment, the polling interval can be determined based on a service level agreement (SLA) contained in an extensible markup language (XML) file. In some embodiments, the polling interval can be calculated by the data tier so as to ensure the SLA, while at the same time minimizing the number of polls in order to reduce network traffic. This minimizing feature is described in more detail in FIG. 8.

In an alternative implementation, there can be a thread deployed and running on each state replica. This thread can periodically look for timers that have expired and then notify the engine that had initially set the corresponding expired timer. The engine, in turn can process the expired timer. Since the notified engine is the last engine that processed a message for the session, affinity is created between the engine and the timer.

Additionally, there can be other possible implementations for enabling timer affinity within the scope of the present embodiments, as will be evident to one of ordinary skill in the art based on this disclosure. It should be noted that the embodiments are not limited to one specific implementation and that any one, all or some of the implementations can be implemented, as desired.

In one embodiment, there can be a partition client data structure on each state replica. The partition client can monitor and provide information regarding engine health for a particular engine. For example, it can keep track of the last time that the state tier has heard from the engine (the last time that the engine has accessed the state tier). If the time period reaches a specified length (e.g. 1 second), the partition client can ping the engine to check whether it has failed. If the engine fails to respond, it can be declared dead by the partition client. In one embodiment, part of declaring the engine dead can include reassigning the timers associated with that engine to one or more other engines in the cluster. Since the engine is assumed to have failed, the timers can be considered un-owned and thus they can be reassigned to the next engine that polls the state tier. Alternatively, the un-owned timers can be distributed among several engines to reduce any possible processing overload.

During regular call processing, messages are received by the load balancer. The load balancer can be a sticky load balancer, meaning that it can distribute the message to the engine that handled the last message for the particular call. Thus, once a message is received, it is distributed to the engine, which can in turn retrieve and set the call state in the state tier. For example, the engine can retrieve state information, process the message, set the call state and cache some or all of the state information in a near-cache at the engine. In one embodiment, the engine node has a particular identifier (ID) associated with it and this information can also be maintained in the state replica. Accordingly, the state replica can contain information regarding which engine has set the particular call state.

Part of setting the call state includes setting appropriate timers in the state tier. These timers would fire in cases where the time period specified by the timer lapses before the next message is received or some other specific event occurs. For example, when an INVITE message is received, a timer is set. If no response is received to the INVITE message within a certain time period, the timer fires.

When timers fire, they can be assigned to the particular engine based on the engine ID information, as previously mentioned. In order to process the timer, the engine can lock the call state in the state tier and process the timer by performing the specified action (e.g. retransmitting a message, etc.). In some cases, the engine can already have the needed state information available locally in the near-cache and it may not need to retrieve the call state again.

Figure 4:
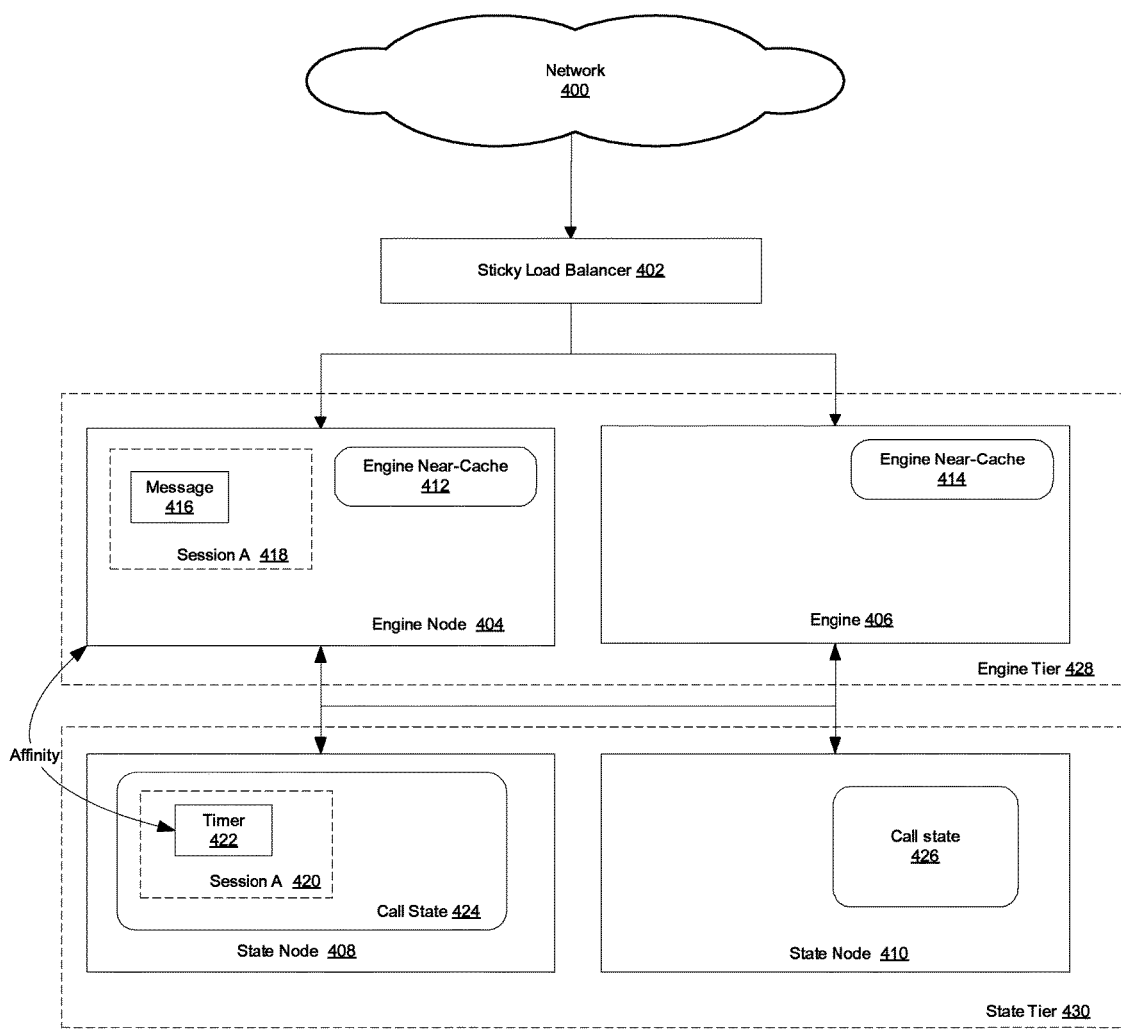
FIG. 4 is an illustration of timer affinity within a SIP server deployment, in accordance with various embodiments.

FIG. 4 is an illustration of timer affinity within a SIP server deployment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, messages from the network 400 can be received to the SIP server deployment at a sticky load balancer 402. The load balancer can in turn distribute the messages to engine nodes 404, 406 in the engine tier 428 for processing. In one embodiment, the load balancer is sticky, i.e. it tries to distribute all messages for one call leg to the same engine node for efficiency purposes.

The engine nodes can process the messages by retrieving and setting any necessary call state in the state replica nodes 408, 410 at the state tier 430. The state nodes can maintain the call state 424, 426 for the calls, which can be locked, read and updated by the engine nodes.

As illustrated, the engine node 404 can receive an incoming message 416 associated with session A 418 and process it. As part of processing the message, the engine node 404 may need to set a timer 422 on state node 408. As such, the timer 422 is also associated with session A 420. Once initiated, the timer gradually counts down until its specified time period is expired and then is fired. In one embodiment, when the timer 422 expires, it is determined which engine node had set the timer and the timer is assigned to that engine node for processing. In this illustration, engine node 404 had originally initiated the timer and thus the state node 408 will assign timer 422 to engine node 404 for processing. As part of processing the timer, the engine node may perform corrective actions, retransmit messages, set other timers, and execute other functionality.

In various embodiments, each engine node can implement a near-cache 412, 414 to store a portion of the call state. When such a near cache is used, an engine tier server can first check its local cache for existing call state data when processing various messages. In one embodiment, if the cache contains the data needed by the engine server, and if the local copy is up to date (when compared to the state tier copy), the engine node can lock the call state in the state tier but read directly from its cache. This can improve response time performance for the request because the engine does not have to retrieve the call state data from a data tier server.

Retrieving call state from the state tier can involve various costs. One such cost is the time duration of the communication and transporting the state data between the engine node and a state replica. Another such cost is the time for serialization and de-serialization of the call state. In modern systems, serialization is used to transmit an object or data over the network as a series of bytes. De-serialization involves using these bytes on the receiving end in order to re-construct the object (or a copy thereof). As an illustration, the Java programming language provides automatic serialization and may require that the object be marked by implementing the java.io.Serializable interface. Java can then handle the serialization internally.

In various embodiments, such serialization and de-serialization can introduce latency which in certain cases may be undesirable. For example, during an initial call set up, the SIP server can receive a flurry of initial messages from several SIP clients. It may be advantageous to maintain a local copy of the state on the engine server while handling this flurry of messages, instead of repeatedly accessing the state tier upon every message. Maintaining such a local copy can prevent the need to serialize and de-serialize the state data each time since it does not need to be transported across the network.

Call state can be moved into an engine's local cache as needed to respond to SIP client requests or to refresh out-of-date state data. If the cache is full when a new call state should be written to the cache, the least-used call state entry can be removed from the cache and the new entry written.

In various embodiments, the local cache can be more beneficial when a SIP-aware or "sticky" load balancer 402 is used to manage SIP client requests. With a sticky load balancer, all of the requests for one call leg (or session) can be directed to the same engine tier node, which can improve the effectiveness of the cache. For example, if the load balancer is not SIP-aware, subsequent messages/requests for the same call could be distributed to different engine tier servers which may have different cache contents and thus the performance benefit of the near cache can be inhibited. Even in such embodiments, however, some performance improvements can be realized as there should be at least some cache hits. On the other hand, when messages for the same call leg are distributed to the same engine node, it is more likely that the engine node has the state needed for the message stored locally in the near cache. In this manner, latency can be further improved.

In some embodiments, there may be a tension between using a near cache that is too large and reducing latency caused by garbage collection. Since objects in the near cache can be complex or long lived objects, it may be more difficult for the garbage collector to remove them in order to clean up the memory. This can introduce latency, as previously discussed. On the other hand, using the near cache can reduce the time costs of communicating, transporting, serializing and deserializing data. Therefore, it may be preferable to tune various factors such as the size of the cache, the JVM and its garbage collection to a proper balance in order to achieve maximum performance output.

In various embodiments, during the processing of messages, the engine node can store state information into the near cache as needed. With sticky load balancers, the near-cache is used on the assumption that the engine that is handling the current message for a particular call will also need that state information for the next message associated with that call. During times when numerous messages are expected for a session, the near-cache can be used to load the call state therein. When timer affinity is used, the near-cache can provide further performance advantages because the state information needed to process a timer is more likely to be in the near-cache of an engine that set the timer. This is because the engine that originally set the timer had also processed a message associated with the same call or session. Thus, if the timer is fired on the engine that originally set the timer, it is more likely that that engine would not need to re-obtain the call state from the state tier in order to process the timer.

Figure 5:
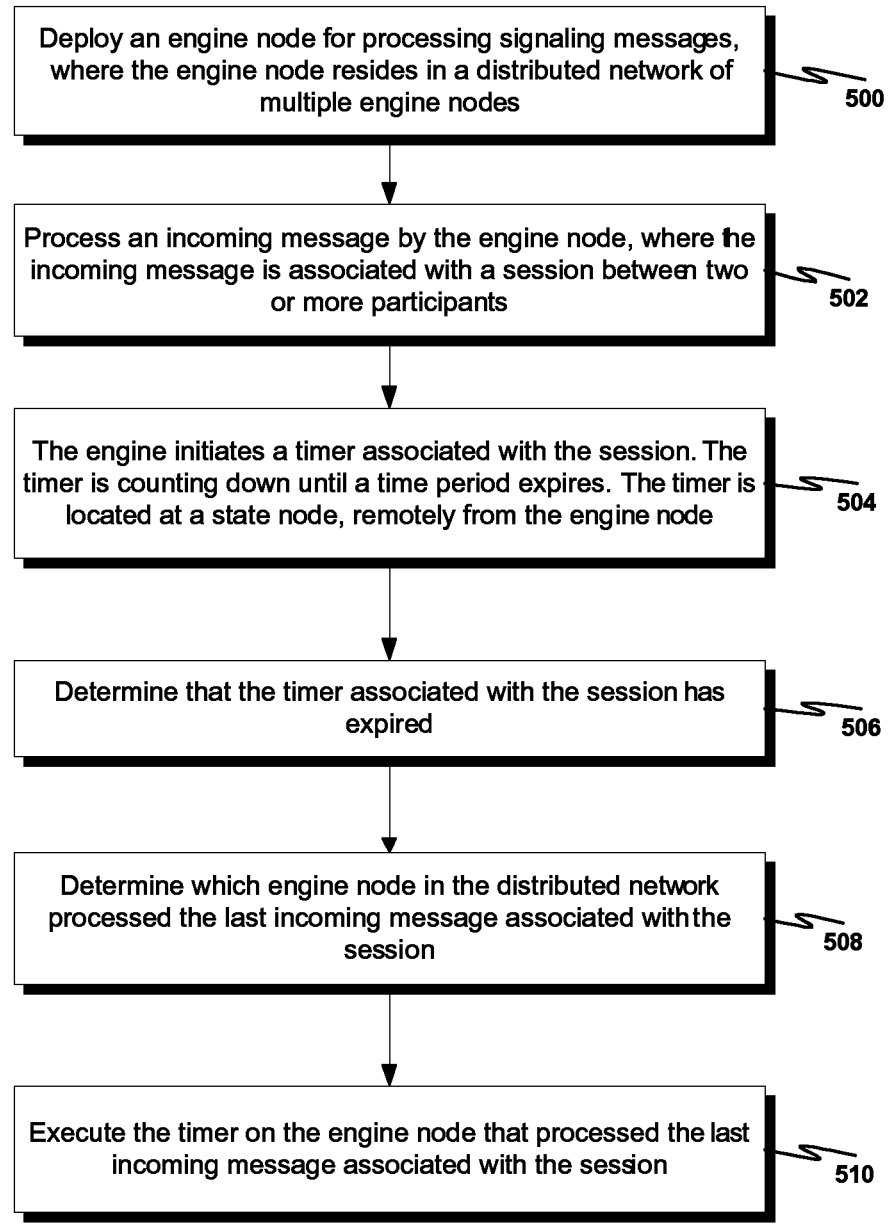
FIG. 5 is an exemplary flow chart diagram of a process for providing timer affinity, in accordance with various embodiments.

FIG. 5 is an exemplary flow chart diagram of a process for providing timer affinity, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. It will also be apparent to one of ordinary skill in the art that steps can be added to or omitted from this illustration, without departing from the scope of certain embodiments.

As shown in step 500, an engine node can be deployed for processing signaling messages. The engine node can reside in a distributed cluster network of multiple engine nodes called an engine tier. In step 502, the engine node can process an incoming message from the network. The incoming message can be associated with a session between two or more participants, such as mobile phones, PDAs or other devices.

In step 504, during the processing of the message, the engine initiates a timer associated with the session. The timer is gradually counting down until a time period expires. In various embodiments, the timers are maintained at a state node, located remotely from the engine node. In step 506, the state node can determine that the timer associated with the session has expired. When this occurs, the state node can determine which engine node in the distributed cluster network processed the last incoming message associated with the session, as shown in step 508. Once that is determined, the timer can be executed on the engine node that processed the last incoming message for the call, as shown in step 510.

Figure 6A:
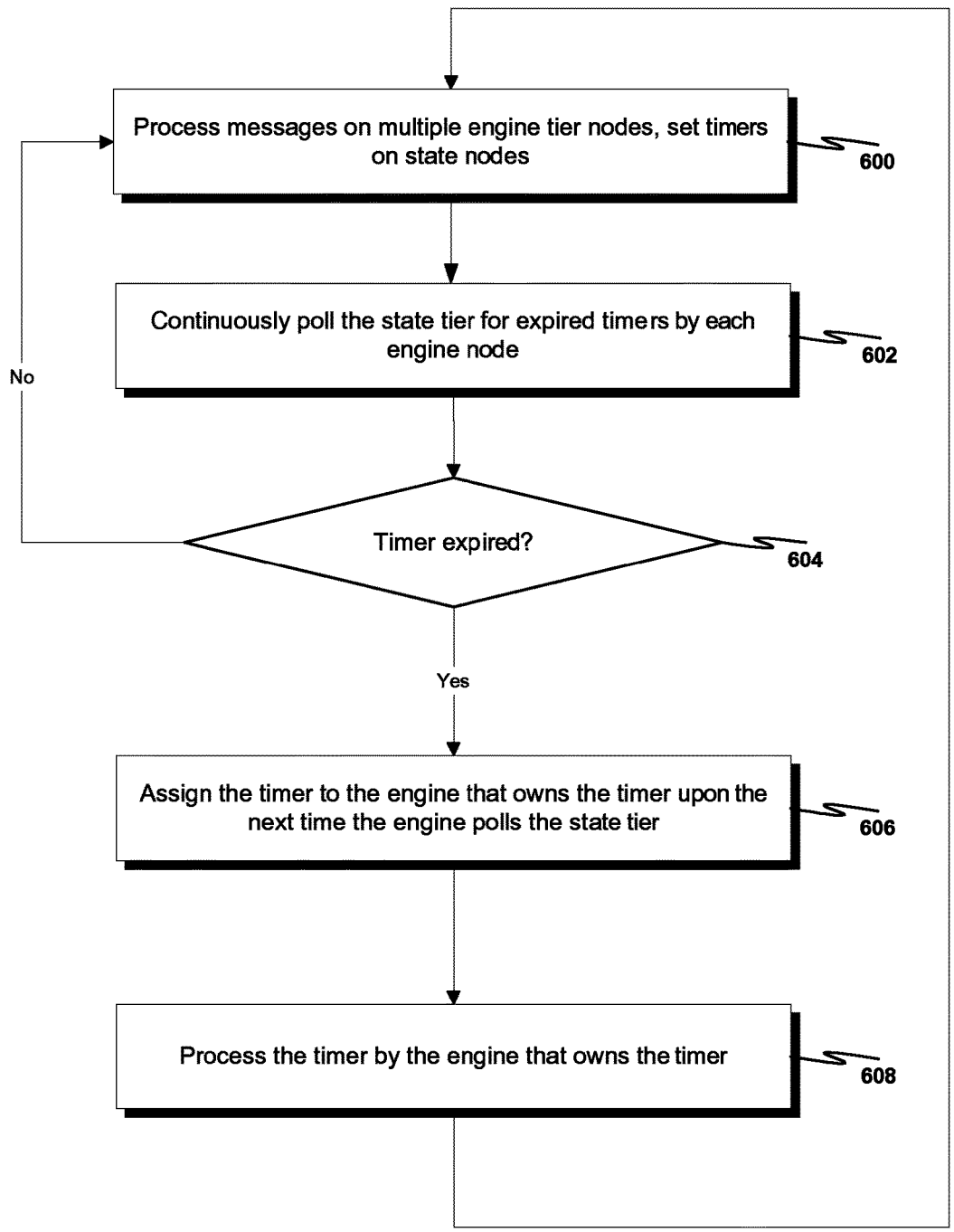
FIG. 6A is flow chart diagram for a first possible implementation of enabling timer affinity, in accordance with various embodiments.

FIG. 6A is flow chart diagram for a first possible implementation of enabling timer affinity, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. It will also be apparent to one of ordinary skill in the art that steps can be added to or omitted from this illustration, without departing from the scope of certain embodiments.

As shown in step 600, the engine nodes can be processing various SIP messages. During the processing of these messages, the engine can read and write state information to the state tier. In addition, each engine periodically polls the state tier for any expired timers that belong to that particular engine, as shown in step 602. When polled, the state node can determine if there are any expired timers that belong to the polling engine (step 604) and if there are, the state node can assign the timer to the engine that owns it, as shown in step 606. In addition, if there are any un-owned timers (e.g. as in the event of some engine failure), these un-owned timers can also be assigned to the next polling engine. If there are no expired timers, the state node need not take any action and can wait until the next poll. This type of implementation removes some of the processing load from the state replicas and allows them to function as more of a storage unit.

In step 608, if the engine is assigned timers which have affinity to it, the engine can process the timers by performing the appropriate corrective action, as specified by the SIP protocol. If the timer is an application timer, the engine can perform an action that is custom according to the application.

Figure 6B:
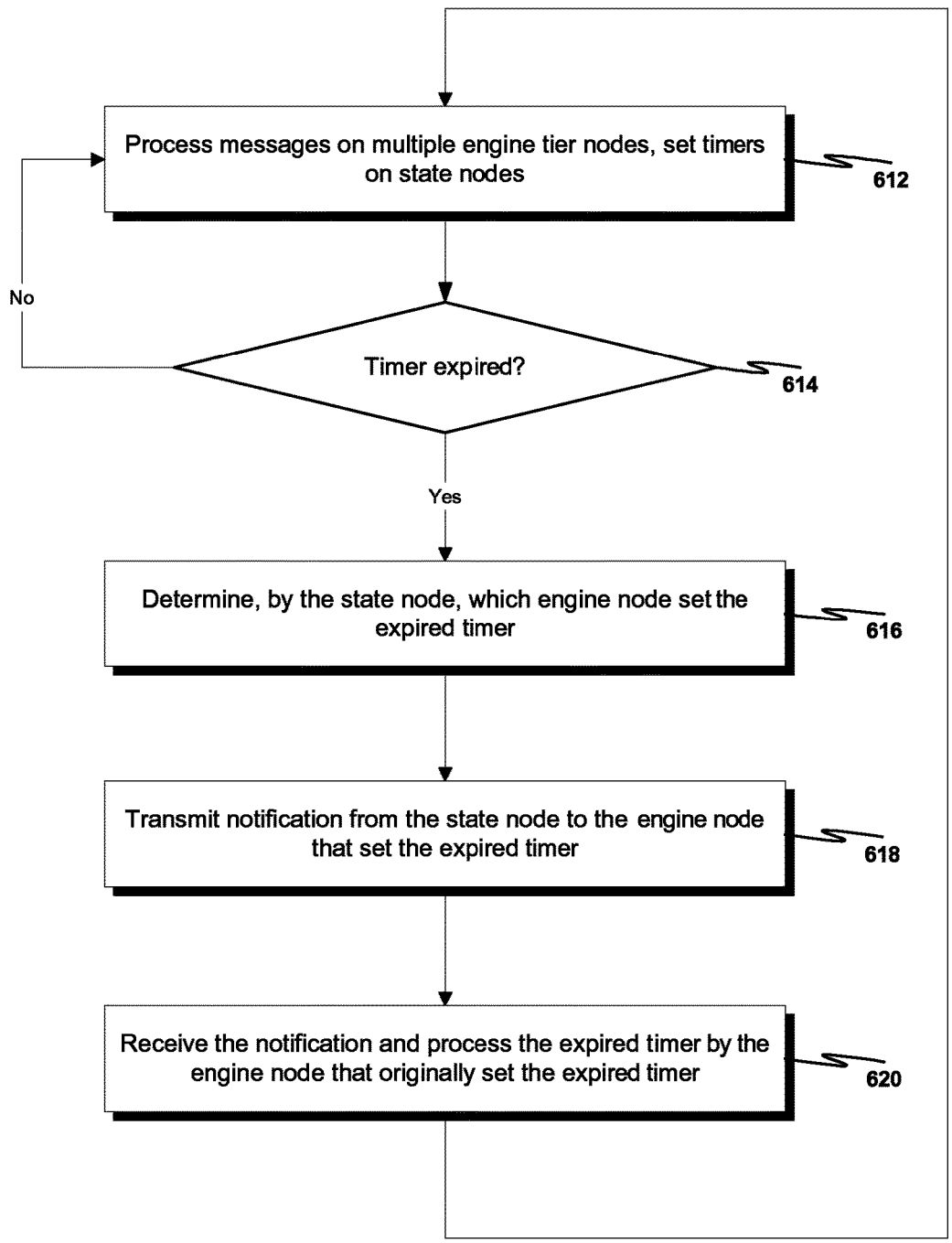
FIG. 6B is flow chart diagram for a second possible implementation of enabling timer affinity, in accordance with various embodiments.

FIG. 6B is flow chart diagram for a second possible implementation of enabling timer affinity, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. It will also be apparent to one of ordinary skill in the art that steps can be added to or omitted from this illustration, without departing from the scope of certain embodiments.

As shown in step 612, once deployed, the engine nodes can continuously process messages and set timers on state nodes. When a timer expires (step 614), the state node can determine which engine node had set the timer, as shown in step 616. Once that determination is made, a notification can be transmitted to the engine node, as shown in step 618. The engine node can thus receive the notification and process the expired timer, as shown in step 620.

In certain cases, the second implementation may add some processing to the state replica nodes since they need to notify the appropriate engine when a timer has expired. This may or may not be desirable depending on context. Either of the implementations can be used and alternatively, the selection of the implementation may be made configurable.

Figure 7:
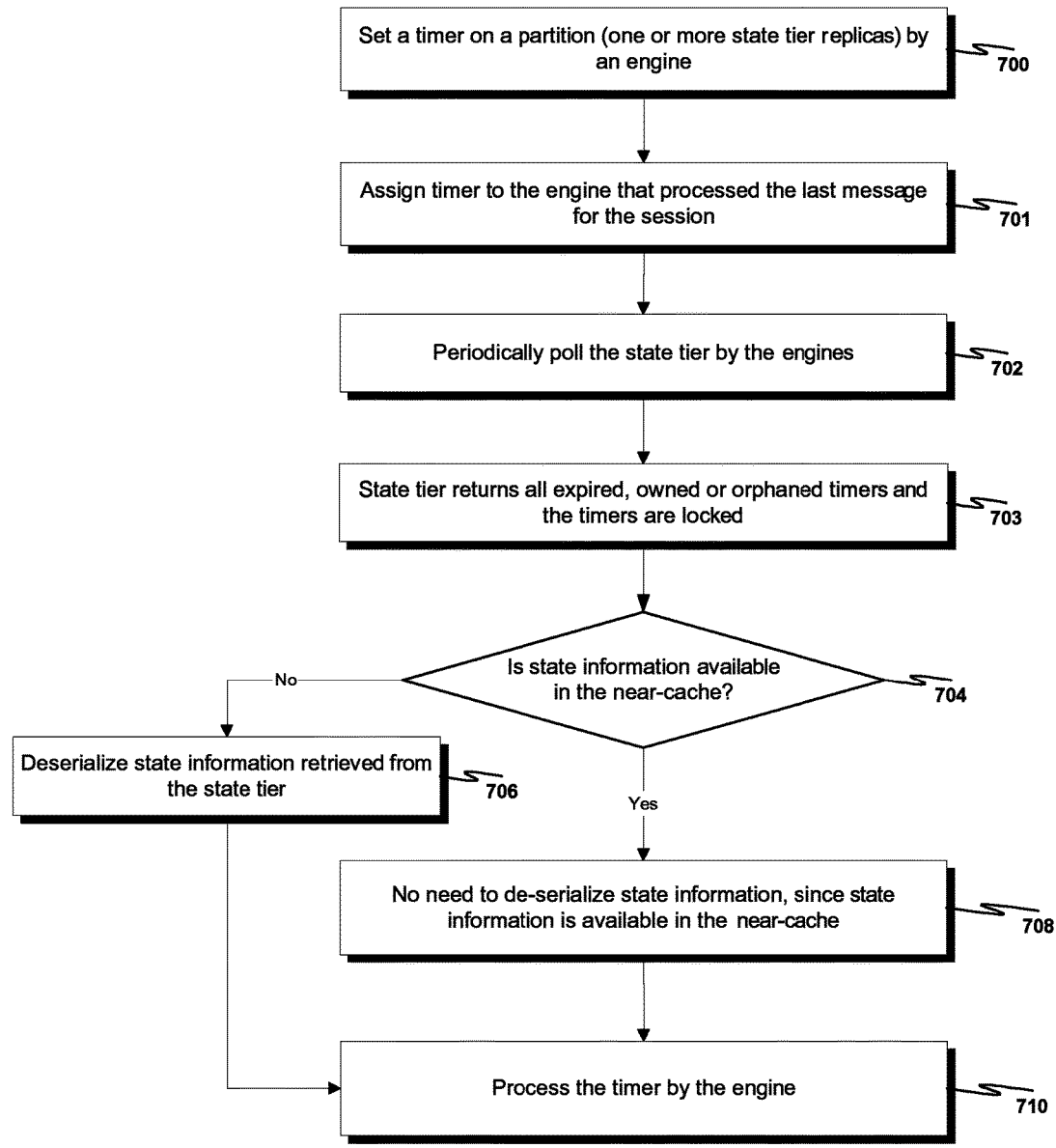
FIG. 7 is an exemplary flow chart diagram of timer affinity utilized in conjunction with the engine near-cache, in accordance with various embodiments.

FIG. 7 is an exemplary flow chart diagram of timer affinity utilized in conjunction with the engine near-cache, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. It will also be apparent to one of ordinary skill in the art that steps can be added to or omitted from this illustration, without departing from the scope of certain embodiments.

As shown in step 700, the engine node can set a timer on a partition that can include one or more state tier replicas. As shown in step 701, the timers have a unique identifier that associates them to a particular engine. In step 702, the engines periodically poll the state tier replicas for expired timers. In response, the state tier can return all expired, owned and/or orphaned timers to the engine and lock the respective timers in the state tier. At this point, if state information is in the engine near-cache (step 704), there is no need to deserialize the timers (step 708) before processing them (step 710). In certain embodiments, it may also be desirable to check whether the state information is up-to-date when compared to the state tier, as other engine nodes may have changed the call state since it was stored in the near-cache.

If the state information is not available in the near-cache, the engine node may need to de-serialize the state information retrieved from the state tier, as shown in step 706. However, even in these instances, timer affinity can provide certain benefits. For example, other data which is unrelated to the SIP protocol, may be locally available or cached at the server hosting the engine node. Furthermore, hot-standby type of deployments can be enabled, such that there can be engines which do not process any timers. Additional performance enhancements can also be enabled, as will be apparent to one of ordinary skill in the art based on this disclosure.

Figure 8:
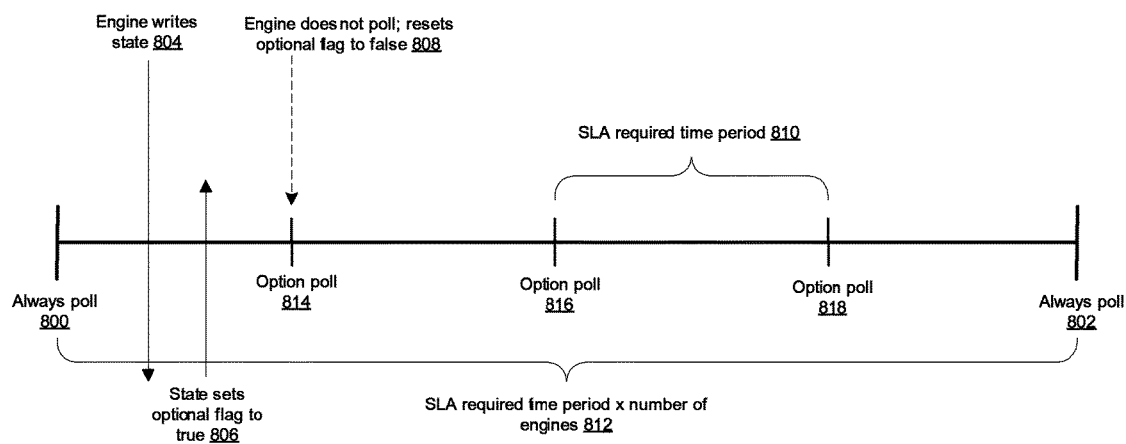
FIG. 8 is an illustration of a possible improvement to minimize the number of engine polls when utilizing the implementation discussed in FIG. 6A.

FIG. 8 is an illustration of a possible improvement to minimize the number of engine polls when utilizing the implementation discussed in FIG. 6A. Although this diagram depicts certain steps being taken at certain time intervals, such depiction is merely for illustrative purposes. It will be apparent to those skilled in the art that these steps can be performed at other intervals or not performed at all. It will also be evident that additional steps can be performed at the various intervals, within the scope of the present embodiments.

When using the polling implementation, each engine can periodically poll the state replicas for expired timers. In order to ensure the service level agreement (SLA), the engine may need to maintain a required accuracy of firing and thus may be required to poll every specified interval of time. In some embodiments, it may be advantageous to reduce or minimize the number of polls so as to reduce the overall network traffic. Thus, in one embodiment, the engine poll interval is calculated by the data tier so as to ensure the SLA, while at the same time minimizing polls.

As illustrated, the SLA can be adjusted by a timer increment variable 810 (e.g. 100 milliseconds). This can be a configurable variable in the SIP server, which specifies the maximum period of time that the engine can wait before processing the timer once fired. In one embodiment, each engine can poll the state replicas periodically upon each interval to check whether any timers that belong to that engine have fired. However, since timers generally fire infrequently, this may lead to excessive and unnecessary polling. Thus, in one embodiment, engine polling can be optimized according to whether there are any expired timers that need to be processed.

In order to minimize the polling, a hint can be provided by the state replicas regarding whether the next poll is optional for the engine. This can be done by setting an optional poll flag to "true" during the standard state read/write operations. In one embodiment, if the flag is set to optional true, the engine will not poll the state tier. Instead, the engine will reset the flag to false so that the engine would poll the state tier upon next time interval in the future.

As illustrated in FIG. 8, in order to guarantee the SLA, the engine can be required to poll the state tier at certain periods. In one embodiment, these periods 800 and 802 can be designated as "must poll" regardless of any hinting. For example, assuming the poll interval is set to 100 milliseconds and assuming there are 4 engine nodes in the cluster, each engine node can be required to poll the state replicas every 400 (4×100) milliseconds 812. In one embodiment, this is done in order to stagger the engines such that there is at least one engine polling the state tier every SLA interval (e.g. 100 ms).

In addition, there can be other intervals which are designated as optional polling intervals 814, 816, 818 for the particular engine. At these optional intervals, the engine will poll unless the optional flag is set to true. Throughout regular system processing, each engine performs many reads/writes to the state tier 804. During these state read/write operations, if there are no expired timers that belong to the engine, the state replica can set the optional flag to true 806. In that case, when the engine reaches the next optional polling interval 814, the engine would read the flag and choose not to poll the state tier. Instead, the engine would reset the optional flag to false (default value) for the next time interval. Thus in a typical busy system, since there are numerous state write operations being performed continuously and since timers fire only infrequently, most engines would not poll the state tier during the optional time intervals. In an idle system, on the other hand, the engines would likely poll the state tier very often since there would not be many read/write operations and thus not many hints (via optional flag) provided by the state tier. However this is acceptable since in an idle system there isn't a large processing load of client communications to handle for the engines.

In various embodiments, the SIP server can have two modes of operation. In the first mode, the SIP server can function without any timer affinity and the timers can be distributed across the engines so as to minimize timer polling, while still ensuring the SLA. In the second mode, the SIP server can function with timer affinity and timers would be fired on the engine that last accessed the call. With the timer affinity mode, the state replica can request that each engine in the cluster return for a poll after the specified time period. In order to reduce unnecessary polling, the polling strategy can be further optimized by allowing the engine to decide that the next poll is optional, as described in FIG. 8.

Various embodiments previously described include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A telecommunication system that provides timer affinity through notifications, said telecommunication system comprising:
    an engine tier comprising a plurality of computing devices and a plurality of engine nodes executing on said plurality of computer devices that process a plurality of communications associated with a plurality of sessions;
    a state tier comprising a plurality of state nodes that store a plurality of session states associated with said plurality of sessions;
    a plurality of timer objects associated with the plurality of sessions, wherein the plurality of timer objects are initiated by the plurality of engine nodes upon having processed said plurality of communications, and stored on said state tier; and
    a notification thread deployed and running on each state node of said plurality of state nodes, wherein
        the notification thread periodically looks for expired timer objects from among said plurality of timer objects stored on the state node,
        the notification thread upon detecting an expired timer object transmits a notification, independent of engine tier polling, to a particular engine node of said plurality of engine nodes that is determined to have initiated the expired timer object; and
        the notification thread thereby creates affinity between the expired timer object and the particular engine node.

2. The telecommunication system of claim 1, wherein:
    each of said plurality of engine nodes has a unique identifier which is associated with timer objects initiated by each of said plurality of engine nodes; and
    wherein the notification thread utilizes the unique identifier associated with the expired timer object to transmit the notification to the particular engine node of said plurality of engine nodes.

3. The telecommunication system of claim 1, further comprising:
    a plurality of local near-caches in the engine tier associated with each of said plurality of engine nodes, wherein each local near-cache of the plurality of local near-caches temporarily maintains call state information associated with sessions processed by an associated engine node.

4. The telecommunication system of claim 3, wherein processing the expired timer object on the particular engine node increases a probability that call state information for a session associated with the expired timer object is available in a local near-cache associated with the particular engine node.

5. The telecommunication system of claim 1, wherein the engine tier further includes:
    a hot standby deployment of two or more engine nodes, wherein at least one but not all of said two or more engine nodes is redundant and does not process any messages.

6. The telecommunication system of claim 1, further comprising:
    a partition client residing on the state tier, said partition client monitoring health information of the plurality of engine nodes, wherein, if the partition client determines that an engine node has failed, the partition client reassigns timer objects associated with the failed engine node to a different engine node.

7. The telecommunication system of claim 1, wherein engine tier and the state tier comprise a session initiation protocol (SIP) application server.

8. The telecommunication system of claim 1, wherein:
    the plurality of state nodes of the state tier are configured to reduce polling of timer objects by the engine nodes by determining whether there exist any timer objects associated with the particular engine node from among said plurality of timer objects; and
    setting a flag indicating that polling is optional for said particular engine at a next polling interval if there are no existing timer objects associated with said particular engine.

9. The telecommunications system of claim 8, wherein:
    said particular engine polls the state tier after a predetermined number of polling intervals regardless of the flag.

10. A method for providing timer affinity within a session-based server deployment operating on an engine tier comprising a plurality of engine nodes executing on a plurality of computing devices and a state tier comprising a plurality of state nodes, said method comprising:
    processing a plurality of communications associated with a plurality of sessions using the plurality of engine nodes;
    storing a plurality of session states associated with the plurality of sessions on the state tier;
    initiating a plurality of timer objects associated with the plurality of sessions, wherein said plurality of timer objects is initiated by the plurality of engine nodes upon having processed said plurality of communications, wherein the plurality of timer objects are stored on said state tier;
    running a notification thread on each state node of said plurality of state nodes;
    periodically looking using the notification thread for expired timer objects from among said plurality of timer objects stored on said each state node;

transmitting a notification from the notification thread to a particular engine node of said plurality of engine nodes, independently of state tier polling by the particular engine node, that is determined to have initiated an expired timer object upon detecting the expired timer object; and thereby using the notification thread to create affinity between the expired timer object and the particular engine node.

11. The method of claim 10, further comprising:

associating each of said plurality of engine nodes with a unique identifier which is associated with timer objects initiated by said each of said plurality of engine nodes; and utilizing the unique identifier associated with the expired timer object to enable the notification thread to transmit the notification to the particular engine node of said plurality of engine nodes.

12. The method of claim 10, further comprising:

maintaining a plurality of local near-caches located in the engine tier associated with each of said plurality of engine nodes, wherein each local near-cache temporarily maintains call state information associated with sessions processed by an associated engine node.

13. The method of claim 12, wherein processing the expired timer object on the particular engine node increases a probability that the call state information for a session associated with the expired timer object is available in a local near-cache associated with the particular engine node.

14. The method of claim 10, wherein the plurality of engine nodes further include:

a hot standby deployment of two or more engine nodes, wherein at least one but not all of said two or more engine nodes is redundant and does not process any messages.

15. The method of claim 10, further comprising:

providing a partition client residing on the state tier wherein said partition client monitors health information of the plurality of engine nodes, wherein, if the partition client determines that an engine node has failed, the partition client reassigns timer objects associated with the failed engine node to a different engine node.

16. The method of claim 10, wherein the engine tier and the state tier comprise a session initiated protocol (SIP) application server.

17. The method of claim 10, further comprising:

determining by each of the plurality of state nodes whether there exist any expired timer objects associated with the particular engine node from among said plurality of timer objects; and setting a flag indicating that polling is optional for said particular engine at a next polling interval if there are no existing expired timer objects associated with said particular engine.

18. The method of claim 17, further comprising:

said particular engine polling the state tier after a predetermine number of polling intervals regardless of the flag.

19. A non-transitory computer-readable medium storing instructions for providing timer affinity in a session-based server deployment operating on an engine tier comprising a plurality of engine nodes executing on a plurality of computing devices and a state tier comprising a plurality of state nodes, the instructions, when executed by one or more processors, cause the one or more processors to carry out steps comprising:

processing a plurality of communications associated with a plurality of sessions using the plurality of engine nodes;

storing a plurality of session states associated with the plurality of sessions on the state tier;

initiating a plurality of timer objects associated with the plurality of sessions, wherein said plurality of timer objects is initiated by the plurality of engine nodes upon having processed said plurality of communications, wherein the plurality of timer objects are stored on said state tier;

running a notification thread on each state node of said plurality of state nodes;

periodically looking using the notification thread for expired timer objects from among said plurality of timer objects stored on said each state node;

transmitting a notification from the notification thread to a particular engine node of said plurality of engine nodes, independently from the particular engine node polling the state tier, determined to have initiated an expired timer object upon detecting the expired timer object; and thereby using the notification thread to create affinity between the expired timer object and the particular engine node.

20. The non-transitory computer-readable medium of claim 19, comprising further instructions, which when executed by one or more processors, cause the one or more processors to carry out steps further comprising:

determining by each of the plurality of state nodes whether there exist any expired timer objects associated with the particular engine node from among said plurality of timer objects; and setting a flag indicating that polling is optional for said particular engine if there are no existing expired timer objects associated with said particular engine.

* * * * *

UNITED STATES PATENT AND TRADEMARK OFFICE
CERTIFICATE OF CORRECTION

PATENT NO. : 9,723,048 B2
APPLICATION NO. : 12/260846
DATED : August 1, 2017
INVENTOR(S) : Cosmadopoulos et al.

It is certified that error appears in the above-identified patent and that said Letters Patent is hereby corrected as shown below:

In the Specification

In Column 13, Line 36, delete "that that" and insert -- that --, therefor.

In the Claims

In Column 19, Line 4, in Claim 10, after "node," delete "that is".

Signed and Sealed this
Thirteenth Day of February, 2018

Andrei Iancu
*Director of the United States Patent and Trademark Office*